United States Patent
Jung

(10) Patent No.: US 9,100,801 B2
(45) Date of Patent: Aug. 4, 2015

(54) METHOD AND APPARATUS FOR MANAGING A GROUP PROFILE IN A WI-FI DIRECT COMMUNICATION SYSTEM

(71) Applicant: Samsung Electronics Co., Ltd., Gyeonggi-do (KR)

(72) Inventor: Bu-Seop Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 115 days.

(21) Appl. No.: 13/778,874

(22) Filed: Feb. 27, 2013

(65) Prior Publication Data

US 2013/0242805 A1 Sep. 19, 2013

(30) Foreign Application Priority Data

Mar. 15, 2012 (KR) ........................ 10-2012-0026597

(51) Int. Cl.
| | |
|---|---|
| *H04L 12/28* | (2006.01) |
| *H04W 4/08* | (2009.01) |
| *H04W 4/00* | (2009.01) |
| *H04L 29/08* | (2006.01) |
| *H04W 84/20* | (2009.01) |
| *H04W 8/00* | (2009.01) |

(52) U.S. Cl.
CPC .............. *H04W 4/08* (2013.01); *H04L 12/2809* (2013.01); *H04L 67/30* (2013.01); *H04W 4/001* (2013.01); *H04W 84/20* (2013.01); *H04W 8/005* (2013.01)

(58) Field of Classification Search
None
See application file for complete search history.

(56) References Cited

U.S. PATENT DOCUMENTS

2007/0094279 A1* 4/2007 Mittal et al. .................. 707/100
2009/0319613 A1 12/2009 Hjelm et al.

FOREIGN PATENT DOCUMENTS

KR 10-2011-0073239 A 6/2011

OTHER PUBLICATIONS

"Wi-Fi Certified Wi-Fi Direct"; Wi-Fi Alliance; Oct. 2010; XP008165049.
"Wi-Fi Peer-to-Peer (P2P) Technical Specification"; Version 1.2; Wi-Fi Alliance; 2010; XP008165048.

* cited by examiner

*Primary Examiner* — Afshawn Towfighi
(74) *Attorney, Agent, or Firm* — Cha & Reiter, LLC

(57) ABSTRACT

A Wi-Fi direct communication system and method are used for regenerating a group of an electronic device in the Wi-Fi direct communication system, and an operation mode is determined in information of an obtained profile. When the operation mode is a group owner mode, the electronic device is set to an automatic group owner. At least one device included in the profile information is retrieved, and the retrieved device is invited to the group. When the invitation is completed, the group regeneration is completed.

18 Claims, 10 Drawing Sheets

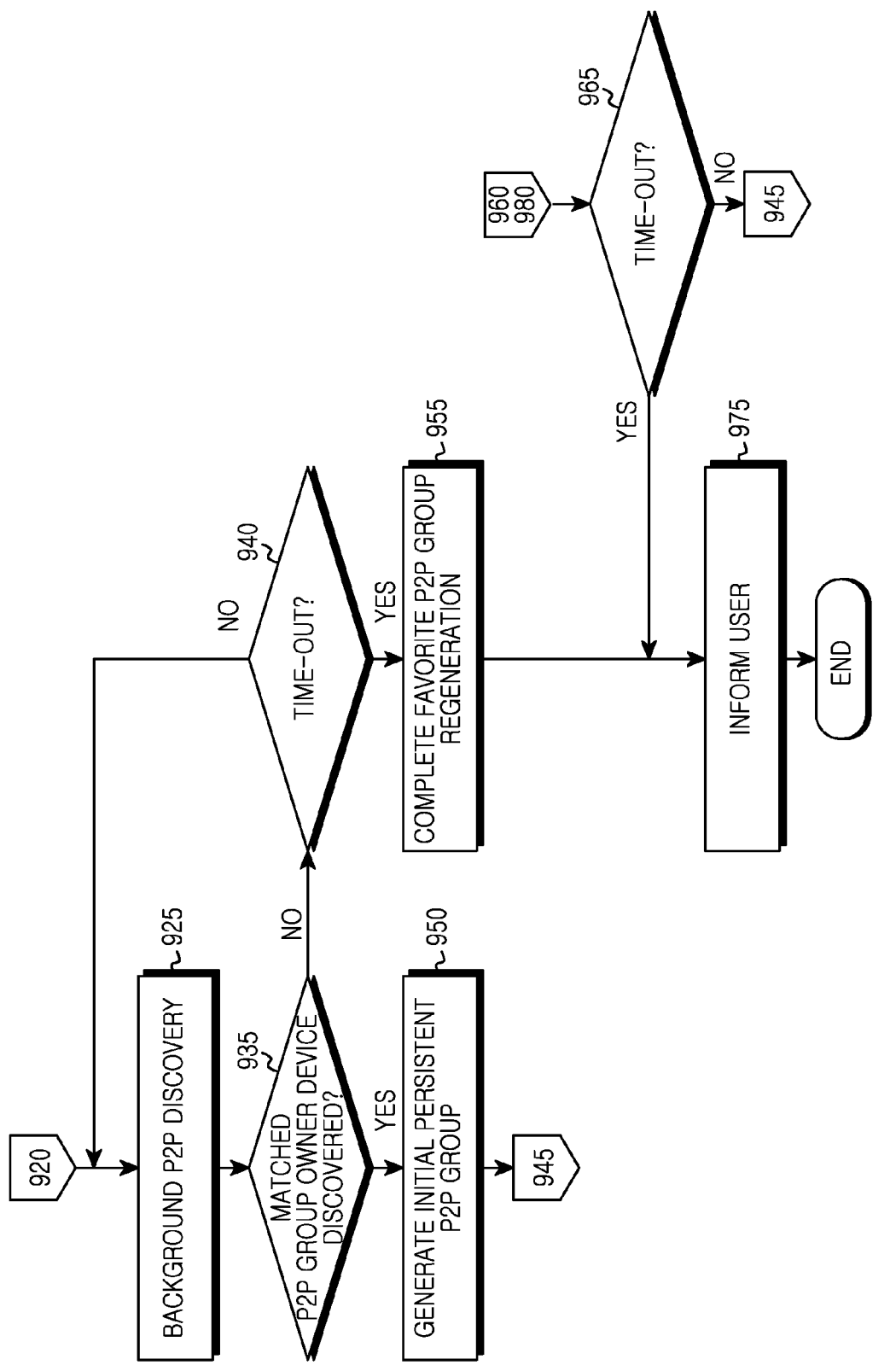

METHOD AND APPARATUS FOR MANAGING A GROUP PROFILE IN A WI-FI DIRECT COMMUNICATION SYSTEM

CLAIM OF PRIORITY

This application claims, pursuant to 35 U.S.C. §119(a), priority to and the benefit of the earlier filing date of a Korean patent application filed in the Korean Intellectual Property Office on Mar. 15, 2012 and assigned Serial No. 10-2012-0026597, the entire disclosure of which is hereby incorporated by reference.

BACKGROUND OF THE INVENTION

1. Field of the Invention

The present invention relates to a Wi-Fi direct communication system. More particularly, the present invention relates to a method and an apparatus for easily regenerating a favorite P2P device group.

2. Description of the Related Art

In a direct communication system using technology for exchanging data wirelessly over a computer network complying with IEEE 802.11 standards, such as WI-FI devices commercially available from the WI-FI ALLIANCE, a user may generate and share files with various peer-to-peer (P2P) devices according to a specific application.

In the case where a P2P group is readily used by a user, a connection to the same group is required again afterward. To this end, a user must discover the device(s) for connection as a part of the P2P group and then select devices one by one.

Accordingly, the user must select the devices one by one each time even when the user regenerates the relevant group using a device list, and thus there is a drawback of inconvenience of re-establishing the connection by the user.

SUMMARY OF THE INVENTION

An aspect of the present invention is to address at least the above-mentioned problems and/or disadvantages and provide additional advantages, by providing a method and an apparatus for managing a group profile in a Wi-Fi direct communication system.

Another aspect of the present invention is to provide a method and an apparatus for easily regenerating a favorite P2P device group by profiling a Wi-Fi P2P group list, an operation mode, a P2P group credential, an access point credential, a connected application, etc. frequently used by a user and managing the same.

In accordance with an aspect of the present invention, a method for regenerating a group of an electronic device in a Wi-Fi direct communication system includes determining an operation mode in information of an obtained profile, when the operation mode is a group owner mode, setting the electronic device to an automatic group owner, retrieving at least one device included in the profile information, inviting a retrieved device, and when the invitation is completed, completing the group regeneration.

In accordance with another aspect of the present invention, a method for generating a group of an electronic device in a Wi-Fi direct communication system includes receiving a group name and an application to be connected, and updating profile information of the group.

In accordance with another further aspect of the present invention, an apparatus for regenerating a group in a Wi-Fi direct communication system includes a processor, a memory, and a program stored in the memory and configured for execution by the processor, wherein the program determines an operation mode in information of an obtained profile, when the operation mode is a group owner mode, sets the electronic device to an automatic group owner, retrieves at least one device included in the profile information, invites a retrieved device, and when the invitation is completed, completes the group regeneration.

In accordance with still another aspect of the present invention, an apparatus for generating a group of an electronic device in a Wi-Fi direct communication system includes a processor, a memory, and a program stored in the memory and configured for execution by the processor, wherein the program receives a group name and an application to be connected and updates profile information of the group.

Other aspects, advantages and salient features of the present invention will become apparent to those skilled in the art from the following detailed description, which, taken in conjunction with the annexed drawings, discloses exemplary embodiments of the present invention.

BRIEF DESCRIPTION OF THE DRAWINGS

The above and other aspects, features and advantages of certain exemplary embodiments of the present invention will be more apparent from the following description taken in conjunction with the accompanying drawings in which:

FIGS. 9A and 9B are a third flowchart illustrating the operation process of the electronic device according to the exemplary embodiment of the present invention.

Throughout the drawings, like reference numerals will be understood to refer to like parts, components and structures.

DETAILED DESCRIPTION OF THE INVENTION

Figure 1:
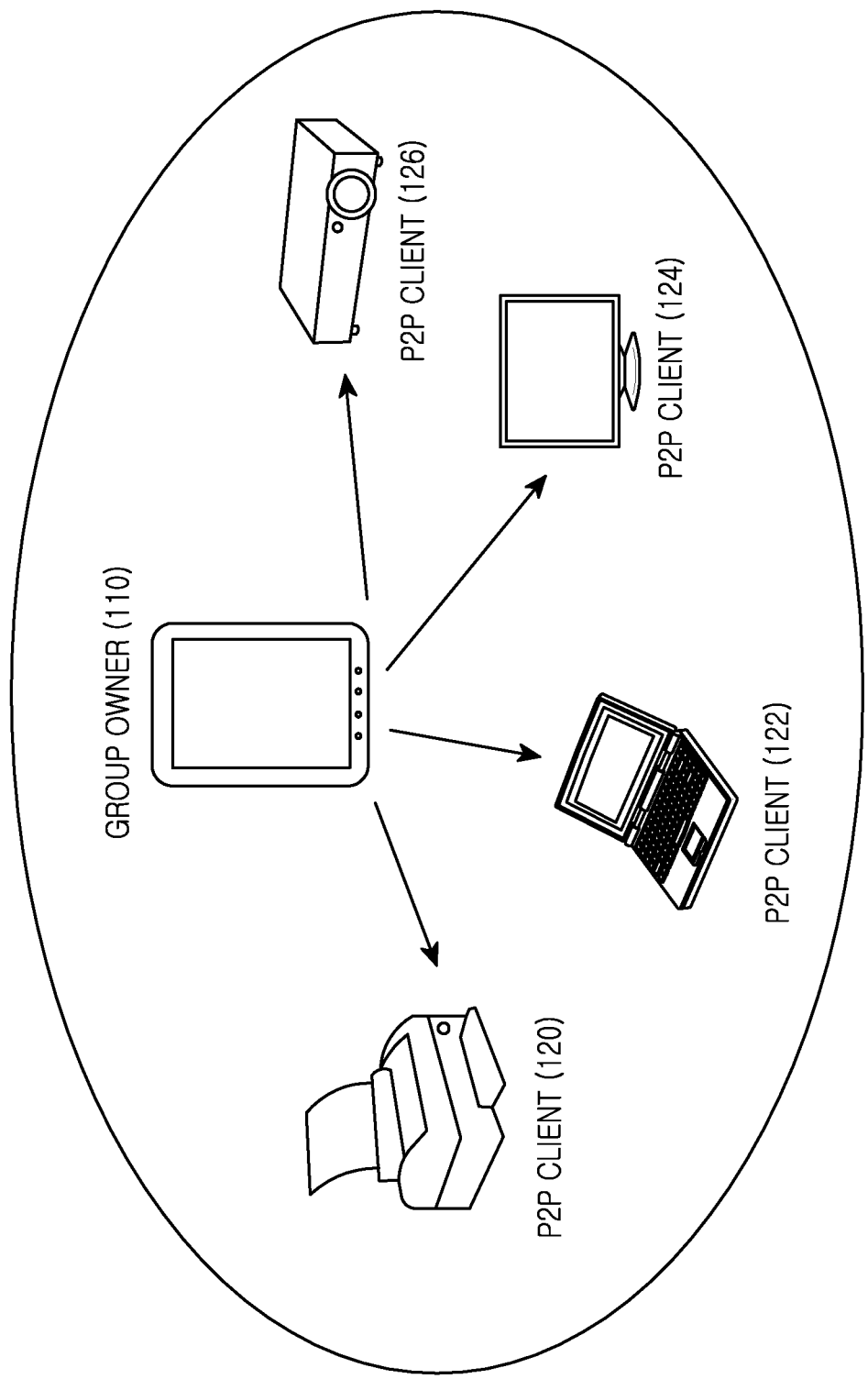
FIG. 1 is a first view illustrating a case of a 1:N mode in a Wi-Fi direct communication system according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It should be understood that the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Briefly, exemplary embodiments of the present invention provide a method and an apparatus for regenerating a favorite P2P device group. More particularly, the present invention relates to a method and an apparatus for easily regenerating a favorite P2P device group by profiling a frequently used Wi-Fi P2P group list, an operation mode, a P2P group credential, an access point credential, a related application, etc. and managing the same.

A Wi-Fi Peer to Peer (P2P) or Wi-Fi direct technology is a technology for providing a direct connection using an existing Wi-Fi interface without using an access point, which is a medium of an existing infrastructure network between Wi-Fi devices.

Most of the Wi-Fi technology in the prior art aims at only using an Internet connection via an access point, and support for direct communication between Wi-Fi devices in the prior art is relatively weak. The short range wireless communications technology at the 2.4 GHz band, commercially available as BLUETOOTH technology from the BLUETOOTH SPECIAL INTEREST GROUP, INC., provides this support to some extent but it is expected that the Wi-Fi direct technology supports a portion which the BLUETOOTH cannot cover with consideration of a transmission distance and a transmission speed.

An Adhoc mode, which is a method for supporting a direct connection, exists in the Wi-Fi technology of the prior art, but the Adhoc mode has not been widely used due to many disadvantages of fragility in security, a power consumption problem, limitations in throughput of 11 Mbps, etc.

A Wi-Fi P2P based system supplements fragility in security by supporting a supplement mode of WPA2 and supports easier connectivity between Wi-Fi devices using a Wi-Fi Simple Configuration (WSC).

Also, the Wi-Fi P2P technology supports IEEE 802.11 standard-based devices up to IEEE 802.11n to remarkably improve a throughput compared to the Adhoc mode, and additionally includes an improved power consumption algorithm.

In particular, unlike BLUETOOTH technology, the Wi-Fi direct technology has an advantage of supporting a 1:N mode to support communication between two or more devices besides a connection between two devices.

The present invention relates to a technology for profiling a 1:N P2P group in which two or more devices are connected as a favorite group and managing the same in a device supporting a Wi-Fi direct technology.

A basic concept of a Wi-Fi direct (Wi-Fi P2P) communication system, used in connection with the present invention, is described below.

FIG. 1 is a first view illustrating a case of a 1:N mode in a Wi-Fi direct communication system according to an exemplary embodiment of the present invention.

Referring to FIG. 1, a group generated when Wi-Fi devices are connected to each other using the Wi-Fi P2P communication system is referred to as a P2P group. Assuming a 1:1 connection, one device 110 operates as a group owner and the rest of the peer or counterpart devices 120, 122, 124, and 126 operate as clients or devices.

At this point, the group owner 110 performs a function in a manner similar to an access point of a wireless LAN network in the prior art, and the clients 120, 122, 124, and 126 serve as stations of the wireless LAN network, so that an operation similar to a legacy Wi-Fi system in the prior art is performed.

In the exemplary embodiment of the present invention, in each P2P group of the present invention, a device is not determined in advance to be a client as in the legacy Wi-Fi system of the prior art, but is dynamically determined to be a client via a protocol of group owner negotiation during a Wi-Fi P2P connection process.

In particular, a P2P group using the Wi-Fi direct technology can provide a 1:N connection as well as a 1:1 connection as shown in FIG. 1, and the number of acceptable clients is determined depending on capability of the group owner 110. The 1:N connection is an important advantage of the Wi-Fi direct technology distinguishing the present invention from the P2P technology of the prior art.

Now, a Wi-Fi direct discovery technology according to the teachings of the present invention is described below.

In a manner similar to a Wi-Fi device in the prior art which may use a SCAN process, such as a Probe Request/Probe Response message exchange process, in order to access an access point, to generate a P2P group via a connection between Wi-Fi P2P devices, a process for detecting the existence of a counterpart device is first performed in the present invention. As in the SCAN process, a basic P2P discovery process according to the present invention also uses an exchange of Probe Request and Probe Response messages.

Now, a connection process between Wi-Fi direct devices is described below.

First, when determining the existence of a desired counterpart device via the above-described P2P discovery process, a Wi-Fi P2P device first performs a Provision Discovery Exchange process with a connection-desired counterpart device. The Provision Discovery Exchange process is one of the important characteristics prescribed in a Wi-Fi P2P standard.

The Wi-Fi P2P device transmits a desired type of WSC configuration method to a connection-desired counterpart device via a Provision Discovery Request message, and the counterpart device that has received the message requests a user's trigger, input, or selection via a popup window on a user interface, an input menu, etc.

The popup window includes information such as a device name of the device that has requested Provision Discovery, so that the user of the requested counterpart device determines whether to accept a connection and activates WSC.

Specifically, a WSC configuration method used for Provision Discovery Exchange includes at least one of a Push Button Configuration (PBC) method, a Personal Identification Number (PIN) from Display method, and PIN from Keypad method. In the case of accepting a connection, a counterpart device requested via the PIN from Display method displays a WSC PIN window or message to request a user to perform a trigger event. A counterpart device requested via the PIN from Keypad method displays a window or message that allows a user to input a PIN, thereby requesting the user to perform a trigger event.

Thereafter, when the Provision Discovery Exchange process ends, a group owner negotiation process is performed between the Wi-Fi direct devices.

As described above, although an access point is not required by the present invention in the connection between the Wi-Fi direct devices, a process for determining a device that will serve as the access point is dynamically performed.

A group owner negotiation process is completed by exchange of GO Negotiation Request/Response and Confirm messages. At this point, both devices compare group owner intent values designated by the respective devices, and a device that has designated a larger value performs the role of a group owner. Further, an attribute of a P2P group, an operating channel, listening timing, etc. generated after connection are determined via this process. The intent value denotes a degree of a group owner.

Now, a provisioning process is described below. When the group owner negotiation process ends, a group owner device operates as a WSC registrar, and a client device operates as a WSC Enrollee, so that the provisioning process for devices exchanging credentials with each other is performed.

When this process ends, a group formation process for allowing two devices to form a P2P group ends. When the group formation process ends, the group owner moves to an actual operation channel to start operating in the role as a group owner, and a group client accesses the group owner using a credential determined via the provisioning process, so that a connection between the two Wi-Fi P2P devices is finally formed.

Now, a persistent group is described below. During the above-described group owner negotiation process, both devices determine whether to form a persistent group or a temporary group.

In this aspect, in the case where the persistent group is determined, both P2P devices automatically store credentials (authentication type, encryption type, network key, SSID) and store their determined role in the persistent group.

That is, from the next connection, upon a user's connection request, devices storing the credentials omit processes such as provision discovery exchange, group owner negotiation, provisioning, etc. and immediately generate a group to raise a connection speed.

Specifically, in the case where a connection-desired device, among devices discovered during the discovery process (provision discovery exchange), is a device designated as a member of a persistent group previously, the group owner device does not perform the above-described connection process but immediately generates a group through an invitation request/response message exchange including an attribute of a previous group, and a client accesses the generated group via an immediately stored credential, so that a connection speed may be raised.

Now, an invitation process is described below. In the case where communication with a different P2P device is required while a specific P2P device already belongs to a certain P2P group, a connection to the existing P2P group may be disconnected and a new P2P group with a connection-desired P2P device may be generated.

However, for a case where the connection with the existing P2P group must be valid, the Wi-Fi direct communication standard prescribes a function for connecting a P2P device to be newly connected to the existing group.

That is, a device already belonging to a P2P group retrieves a connection-desired P2P device via the discovery process, and invites the connection-desired P2P device via an invitation request message including an ID of a current group and attribute information.

The invited P2P device transmits an invitation response message. When the P2P group device accepts the invitation response message, the connection-desired P2P device connects to the group owner of the invited group. At this point, the invitation request message may be transmitted regardless of the group owner and the group client of the relevant group.

Now, a Wi-Fi P2P group in the 1:N mode is described below. One of great characteristics of the Wi-Fi direct technology that is distinguished from other short distance P2P technologies in the prior art is that the Wi-Fi direct technology can generate a group in the 1:N mode around a group owner.

That is, N+1 P2P devices may share one network to communicate with one another.

Figure 2:
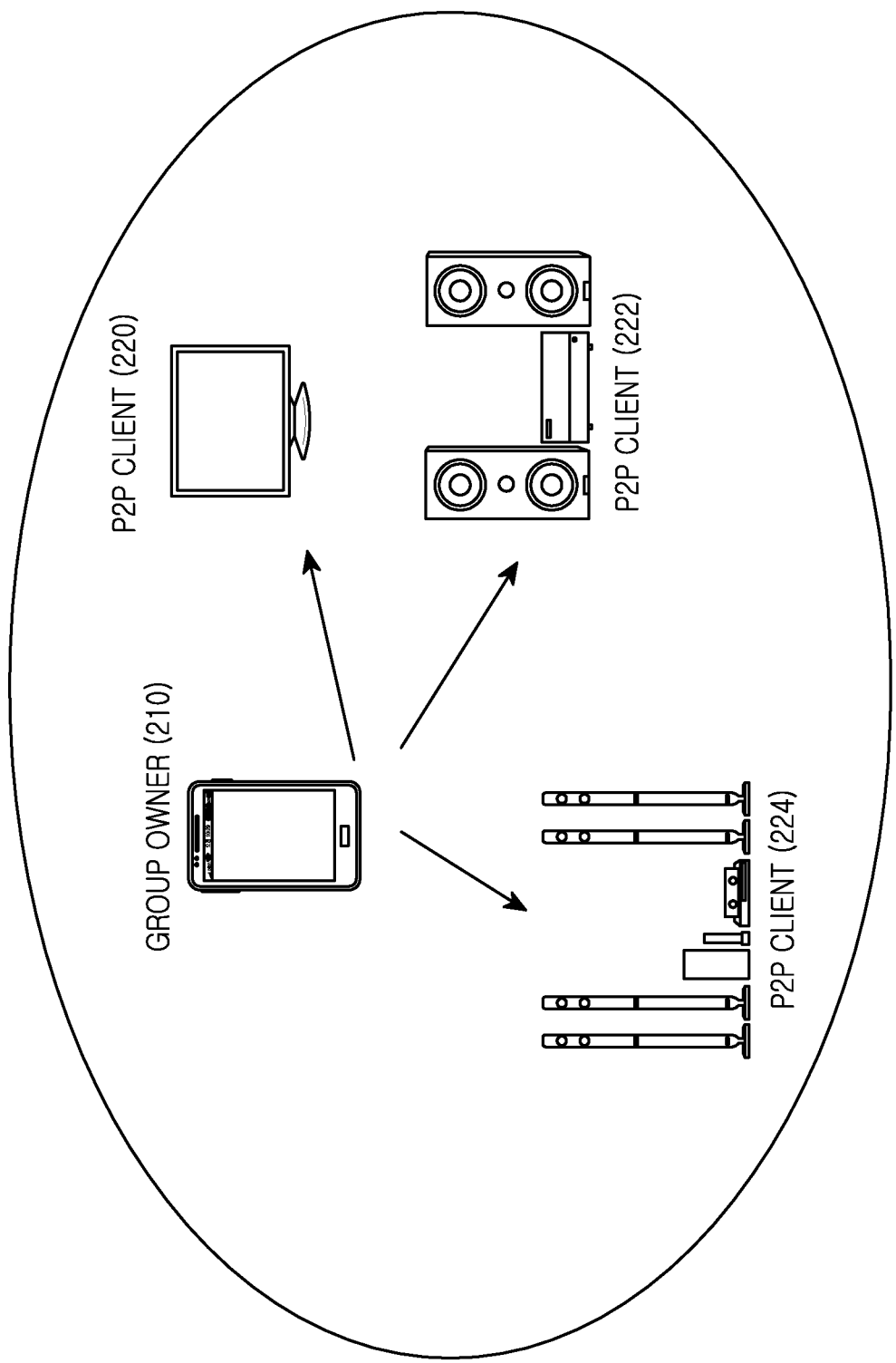
FIG. 2 is a second view illustrating the case of a 1:N mode in a Wi-Fi direct communication system according to the exemplary embodiment of the present invention.

FIG. 2 is a second view illustrating the case of a 1:N mode in a Wi-Fi direct communication system according to the exemplary embodiment of the present invention.

Referring to FIG. 2, in the case where a P2P group owner 210 and P2P clients 220, 222, 224 exist and the P2P group owner 210 is a user, the P2P group owner 210 transmits the user's contents to the P2P clients 220, 222, 224 such as a TV and/or an audio device to reproduce the transmitted contents.

Figure 3:
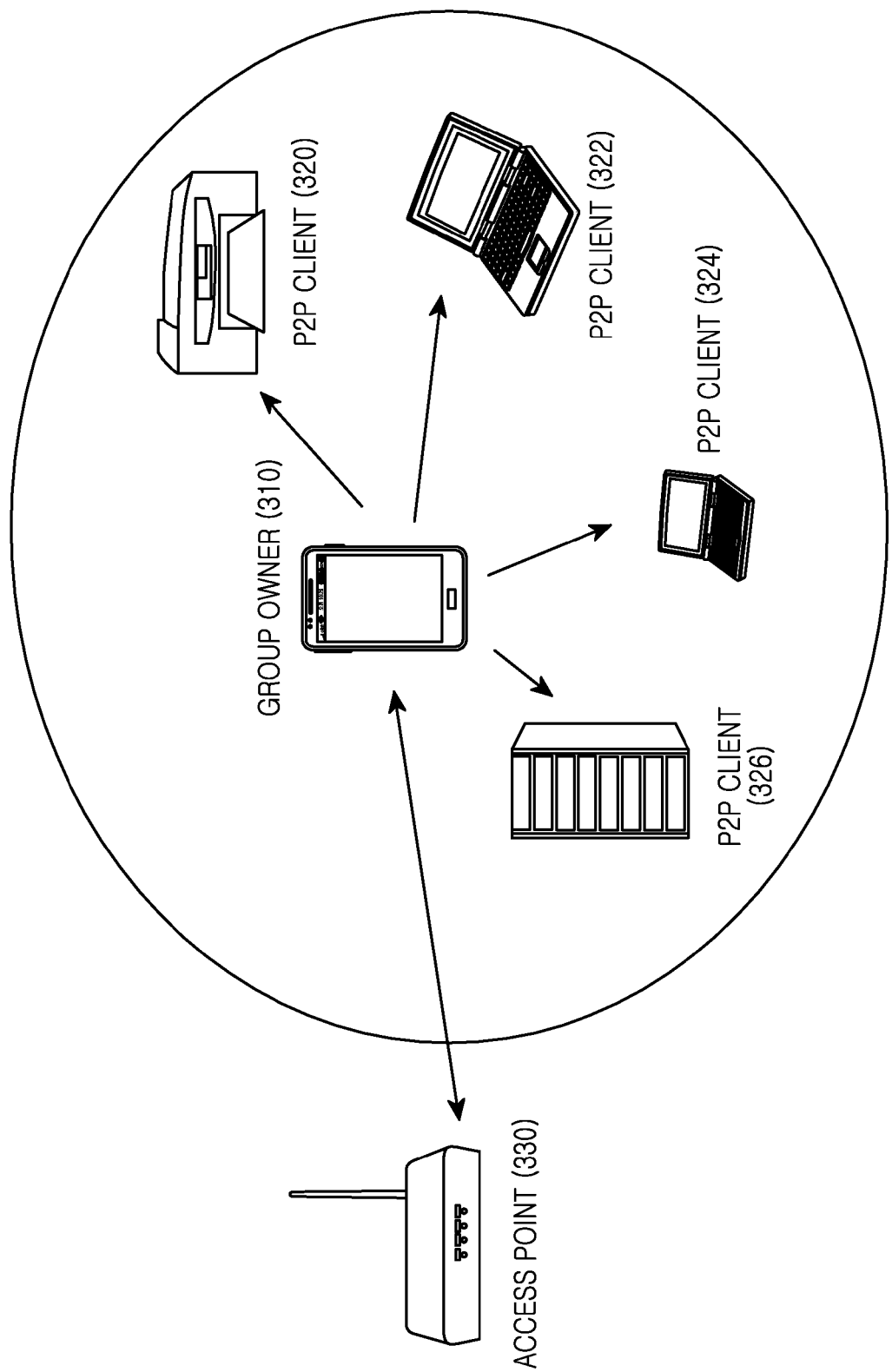
FIG. 3 is a third view illustrating the case of a 1:N mode in a Wi-Fi direct communication system according to the exemplary embodiment of the present invention.

FIG. 3 is a third view illustrating the case of a 1:N mode in a Wi-Fi direct communication system according to the exemplary embodiment of the present invention.

Referring to FIG. 3, a P2P group owner 310, P2P clients 320, 322, 324, 326 and an access point 330 exist, and the P2P group owner 310 connects to the devices 320, 322, 324, 326 such as a printer, a PC, an electronic dictionary, etc. usable at an office and uses such devices 320, 322, 324, 326. In FIG. 3, the device 310 of the user may perform concurrent operations of serving as the group owner of the P2P group and connecting to the access point 330 using a Wi-Fi interface.

Figure 4:
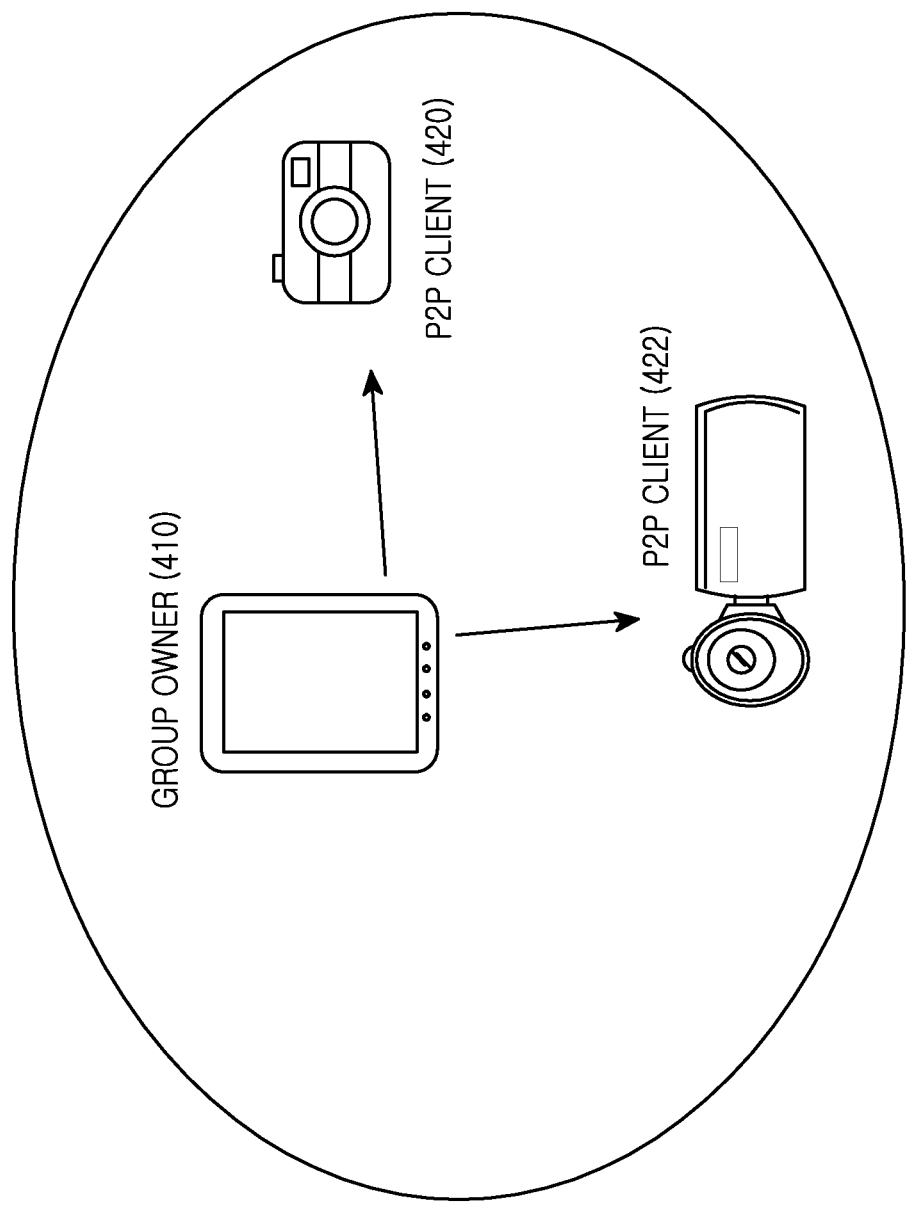
FIG. 4 is a fourth view illustrating the case of a 1:N mode in a Wi-Fi direct communication system according to the exemplary embodiment of the present invention.

FIG. 4 is a fourth view illustrating the case of a 1:N mode in a Wi-Fi direct communication system according to the exemplary embodiment of the present invention.

Referring to FIG. 4, a P2P group owner 410 and P2P clients 420, 422 exist and a P2P group may be generated with shooting or image capture equipment such as a camera, a camcorder, etc., and such P2P clients 420, 422 are used by the group owner 410.

Figure 5:
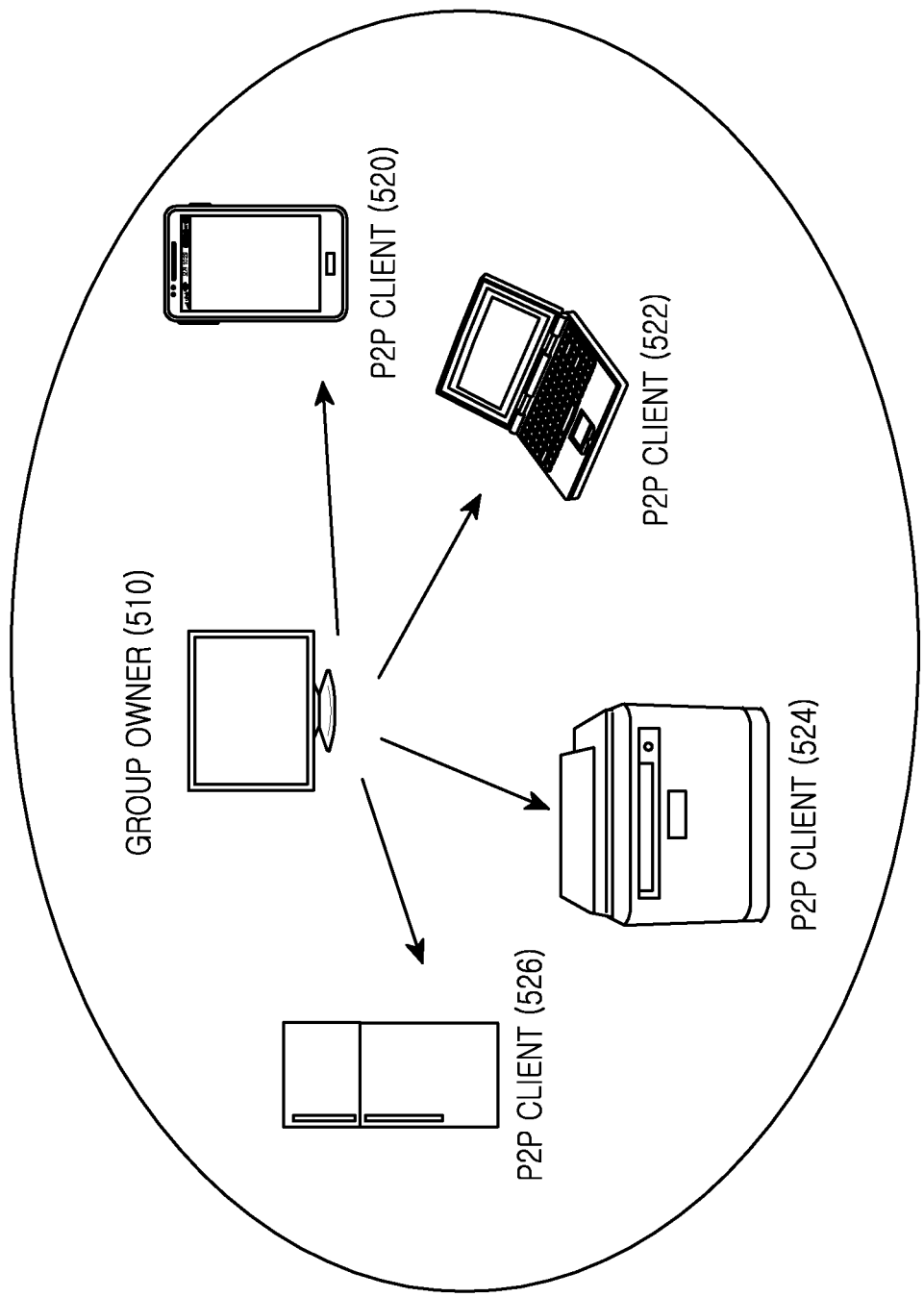
FIG. 5 is a fifth view illustrating the case of a 1:N mode in a Wi-Fi direct communication system according to the exemplary embodiment of the present invention.

FIG. 5 is a fifth view illustrating the case of a 1:N mode in a Wi-Fi direct communication system according to the exemplary embodiment of the present invention.

Referring to FIG. 5, a P2P group owner 510 and P2P clients 520, 522, 524, 526 exist and a user's device 520 serves as a client, not a group owner, and participates in a specific application group to generate a group.

The above-described FIGS. 1-5 illustrate only examples of a small portion of available 1:N groups, and group generation with various P2P devices may be possible depending on the purpose of a user's application to interface with clients having specific functionality, such as a printer or an audio device.

In particular, the Wi-Fi direct communication system is applicable to numerous types of known electronic devices such as a TV, a monitor, an audio, a refrigerator, a printer, a desktop computer, a camera, a camcorder, a projector, etc. as well as mobile devices such as a mobile phone, a notebook computer, a tablet PC, etc.

According to the present invention, when desiring to reuse a currently connected P2P group, a user may designate an arbitrary name as a name of a favorite P2P device group. Alternatively, when desiring to reuse only a portion of the currently connected P2P group, the user may select only a relevant device and designate the device as a favorite P2P device group together with an arbitrary name.

When the favorite P2P device group is designated, the user's device profiles and stores a list of the device as profile information, with the device designated as the favorite P2P group and a current operation mode of the user's device, and credential information of a current group.

In particular, in the case where a user desires that the P2P group designated as the favorite P2P device group is automatically generated even without arbitrary selection by the user when a specific application starts, a matching-desired application may be connected.

Thus, the present invention may regenerate a matched favorite P2P device group automatically when a designated specific application restarts.

According to the present invention, a user does not need to retrieve the same P2P devices of a frequently used P2P group, and does not need to connect to the P2P devices in the P2P group one by one, although the same application and the same P2P group are used every time, so that the user's convenience improves.

Figure 6:
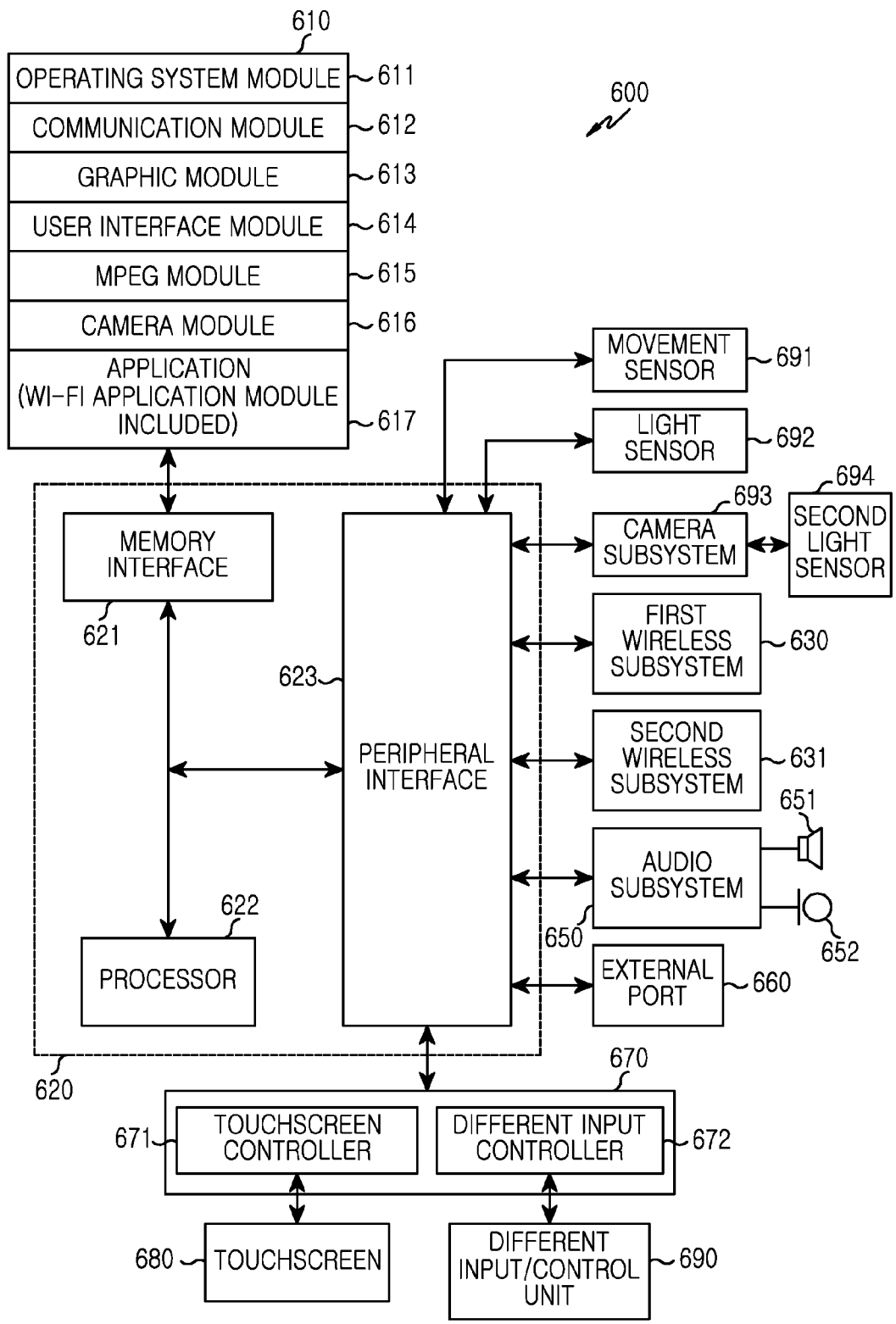
FIG. 6 is a block diagram illustrating a device such as an electronic device according to the exemplary embodiment of the present invention.

FIG. 6 is a block diagram illustrating a device such as an electronic device according to the exemplary embodiment of the present invention.

Referring to FIG. 6, the electronic device 600 may be a portable electronic device, a portable terminal, a mobile phone, a mobile pad, a media player, a tablet computer, a handheld computer, or a Personal Digital Assistant (PDA). Also, the electronic device 600 may be an arbitrary portable electronic device including a device combining two or more functions of these devices.

The electronic device 600 includes a memory 610, a processor unit 620, a first wireless communication subsystem 630, a second wireless communication subsystem 631, an external port 660, an audio subsystem 650, a speaker 651, a microphone 652, an Input/Output (I/O) system 670, a touchscreen 680, and a different input/control unit 690. A plurality of memories 610 and external ports 660 may be used.

The processor unit 620 may include a memory interface 621, one or more processors 622, and a peripheral interface 623. For illustrative purposes only, the entire processor unit 620 may be referred to herein as a processor. The memory interface 621, one or more processors 622, and/or the peripheral interface 623 may be separate elements or may be integrated in one or more integrated circuits.

The processor 622 executes various software programs to perform various functions for the electronic device 600, and performs processes and controls for voice communication and data communication. Also, in addition to these general functions, the processor 622 executes a specific software module (instruction set) stored in the memory 610 to perform various specific functions corresponding to each specific software module. That is, the processor 622 performs a method according to the exemplary embodiment of the present invention in cooperation with software modules stored in the memory 610.

The processor 622 may include one or more data processors, image processors, or a CODEC. The data processor, the image processor, or the CODEC may be separately configured. Also, the processor 622 may be configured using a plurality of processors performing different functions.

The peripheral interface 623 connects the I/O subsystem 670 of the electronic device 600 and various peripheral devices to the processor 621, and the memory 610 (via the memory interface 621).

Various elements of the electronic device 600 may be coupled by one or more communication or data stream lines or communication paths using components and methods known in the art.

The external port 660 may directly connect the electronic device 600 to a different electronic device, or may be used for indirectly connecting the electronic device 600 to a different electronic device via a network (for example, the Internet, an Intranet, a wireless LAN, etc.). For example, the external port 660 may be implemented as a Universal Serial Bus (USB) or a port complying with the IEEE 1394 interface standard for a serial bus interface such as a FIREWIRE port commercially available from APPLE CORPORATION, etc. although not limited thereto.

A movement sensor 691 and a first light sensor 692 may be coupled to the peripheral interface 623 to enable various functions. For example, the movement sensor 691 and the light sensor 692 may be coupled to the peripheral interface 623 to enable detection of movement of the electronic device 600 and detection of light from outside the electronic device 600. In addition, other sensors such as a position measurement system, a temperature sensor, or a human body sensor, etc. may be connected to the peripheral interface 623 to perform related functions.

The camera subsystem 693 may be coupled to a second light sensor 694 to perform a camera function such as shooting, image capture, and video clip recording.

The first light sensor 692 and the second light sensor 694 may be a charged coupled device (CCD) or a complementary metal-oxide semiconductor (CMOS) device.

The electronic device 600 performs a communication function via one or more wireless communication subsystems 630, 631. The wireless communication subsystems 630, 631 may include a Radio Frequency (RF) receiver and transceiver and/or a light (for example, infrared) receiver and transceiver. The first communication subsystem 630 and the second communication subsystem 631 may be classified depending on a communication network with which the electronic device 600 communicates.

For example, the communication network may include a communication subsystem designed for operating via a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and/or a BLUETOOTH network, etc.

However, since the present invention uses at least a Wi-Fi direct communication via a Wi-Fi direct network, one of the first wireless communication subsystem 630 and the second wireless communication subsystem 631 may be a Wi-Fi direct communication subsystem.

The first wireless communication subsystem 630 and the second wireless communication subsystem 631 may be merged to form one wireless communication subsystem.

The audio subsystem 650 may be coupled to the speaker 651 and the microphone 652 to provide functions of voice recognition, voice duplication, digital recording, and input and output of an audio stream such as a telephone function.

That is, the audio subsystem 650 communicates with a user using audio via the speaker 651 and the microphone 652. The audio subsystem 650 receives a data stream via the peripheral interface 623 of the processor unit 620 and converts the received data stream to an electric stream, such as one or more electrical currents or signals. The converted electric stream (electric signal) is transferred to the speaker 651. The speaker 651 converts the electric stream to a sound wave that can be heard by a human being and outputs the sound wave. The microphone 652 converts a sound wave transferred from a human being or other sound sources to an electric stream. The audio subsystem 650 receives the electric stream converted from the microphone 652. The audio subsystem 650 converts the received electric stream to an audio data stream and transmits the converted audio data stream to the peripheral interface 623. The audio subsystem 650 may include an attachable and detachable ear phone, a head phone, or a head set.

The I/O subsystem 670 may include a touchscreen controller 671 and/or a different input controller 672. The touchscreen controller 671 may be coupled to the touchscreen 680.

The touchscreen 680 and the touchscreen controller 671 may detect a contact and movement or stoppage of these using an arbitrary multi-touch detection technology including other proximity sensor arrangements or other elements as well as capacitive, resistive, infrared, and surface acoustic wave technologies for determining one or more contact points with the touchscreen 680 although not limited thereto.

The different input controller 672 may be coupled to the different input/control unit 690. The different input/control unit 690 may include one or more buttons such as up/down buttons for controlling a volume. Also, the buttons may be a push button or a rocker button, a rocker switch, a thumb-wheel, a dial, a stick, and/or a pointer device such as a stylus, etc.

The touchscreen 680 provides an input/output interface between the electronic device 600 and a user. That is, the touchscreen 680 transfers the user's touch input to the electronic device 600. Also, the touchscreen 680 serves as a medium for showing an output of the electronic device 600 to the user.

That is, the touchscreen 680 shows a visual output to the user. This visual output appears in the form of text, graphics, video, and a combination of such visual outputs.

Various displays may be used as the touchscreen 680. For example, the touchscreen 680 may be a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED) or a Flexible LED (FLED).

The memory 610 may be coupled to the memory interface 621. The memory 610 may include a high speed random access memory such as one or more magnetic disc storage devices and/or a non-volatile memory, one or more optical storage devices and/or a flash memory (for example, NAND, NOR).

The memory 610 stores data and information, such as the profile information, as well as software, which may be applications or other forms of software, including software elements. Software elements include an operating system module 611, a communication module 612, a graphic module 613, a user interface module 614, a CODEC module 615, a camera module 616, and one or more application modules 617, etc. The application module 617 includes a Wi-Fi application for controlling a Wi-Fi direct communication system implemented by the present invention. Also, since each module 611-617, which is a software element, can be expressed in terms of a set of instructions, the modules 611-617 may also be expressed as an instruction set. The module may also be expressed as a program. According to the present invention, one or more modules including instructions for performing various methods of the present invention may be stored in the memory 610.

The operating system software 611 (for example, a built-in operating system such as WINDOWS, LINUX, Darwin, RTXC, UNIX, OS X, or VxWorks) includes various software elements for controlling a general system operation. For example, such control of the general system operation may include memory management and control, storage hardware (device) control and management, power control and management, etc. This operating system software 611 performs a function for smoothing communication between various hardware (devices) and software elements (modules).

The communication module 612 may enable communication with other electronic devices such as a computer, a server and/or a portable terminal, etc. via the wireless communication subsystem 630, 631 or the external port 660.

The graphic module 613 includes various software elements for providing and displaying graphics on the touchscreen 680. The graphics may include text, a web page, an icon, a digital image, a video, animation, etc.

The user interface module 614 includes various software elements related to a user interface. The user interface module 614 includes content as to how the state of the user interface is changed or under what condition a change of a user interface state is performed, etc.

The CODEC module 615 may include software elements related to encoding and decoding of a video file. The CODEC module may include an MPEG module and/or a video stream module such as an H204 module. Also, the CODEC module 615 may include a CODEC module for various audio files in known audio formats such as AAA, Adaptive Multi-Rate (AMR), WINDOWS Media Audio (WMA), etc.

The camera module 616 includes camera-related software elements for enabling camera-related processes and functions. The application module 617 includes a browser, electronic mail, an instant message, word processing, keyboard emulation, an address book, a touch list, a widget, Digital Right Management (DRM), voice recognition, voice duplication, position determining function, location based service, etc.

The memory 610 may include an additional module (instructions) besides the above-described modules. Alternatively, the memory 610 may not use some of the modules (instructions) when not needed.

Also, various functions of the electronic device 600 according to the present invention mentioned above or to be mentioned below may be executed by hardware including one or more stream or data processors and/or one or more Application Specific Integrated Circuits (ASIC) and/or a software and/or a combination of such hardware and software.

Figure 7:
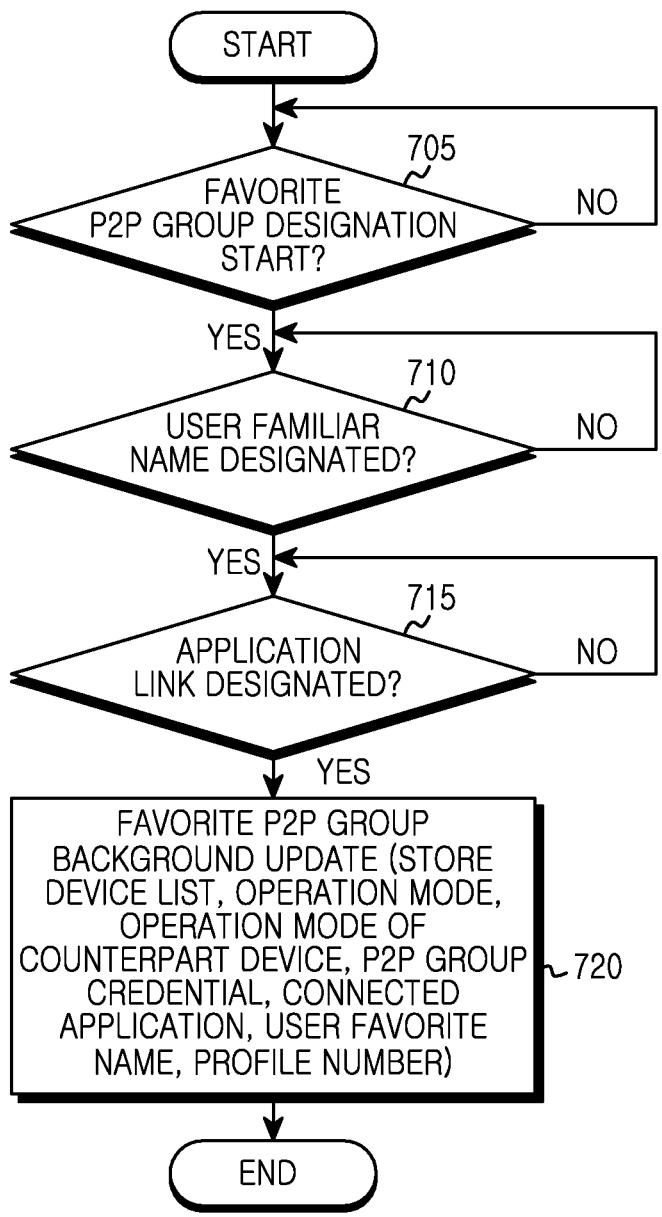
FIG. 7 is a first flowchart illustrating an operation process of the electronic device according to the exemplary embodiment of the present invention.

FIG. 7 is a first flowchart illustrating an operation process of the electronic device according to the exemplary embodiment of the present invention.

Referring to FIG. 7, a user of a Wi-Fi direct communication electronic device belongs to a 1:N mode P2P group and uses the same, and then designates a favorite P2P group for the purpose of reuse.

First, when starting to designate a P2P group, the user may select a desired device from a device list of a currently formed P2P group in step 705. However, if no device is selected, the method loops back to step 705 until a device is selected.

After that, the user designates a name of the current favorite P2P group using a familiar name favored by the user in step 710. However, if no name is designated, the method loops back to step 710 until a name is designated. When desiring that the currently designated favorite P2P group is automatically regenerated when a specific application starts, the user may selectively designate the specific application in step 715. However, if no application is designated, the method loops back to step 715 until an application is designated. Thus, when the designated application starts later, the favorite P2P group is automatically regenerated by the electronic device 600.

In the case where a favorite P2P group is designated, a name is designated by a user, and an application is designated in steps 705-715, the electronic device 600 redefines an attribute so that a list of devices belonging to the currently designated favorite P2P group is easily regenerated afterward and performs an update of the redefined favorite P2P group as a background operation. In addition, when the favorite P2P group is updated, the electronic device 600 stores a list of devices input by the user, an operation mode of the device of the electronic device and an operation mode of a counterpart device in step 720, and the method in FIG. 7 ends. The operation mode of the electronic device 600 indicates whether or not the electronic device 600 is to function as a group owner or not. In this case, profile information regarding a device retrieved from the P2P group, that is, a device list and an operation mode of a relevant device, an operation mode of the electronic device, a credential of a P2P group, an access point credential, a P2P group name, and a profile number for the name may be stored.

In the case where connection information of an access point must be included in the favorite P2P group, the electronic device 600 stores an access credential (SSID, security info) of an access point and stores a credential (group ID, security info) of a current favorite P2P group. In addition, the electronic device 600 stores application information connected to the favorite P2P group and designates a profile number so that the stored information matches with a familiar name input by the user.

The method described above in relation with FIG. 7 under of the present invention may be provided as one or more instructions in one or more software modules, or computer programs stored in an electronic device.

Figure 8:
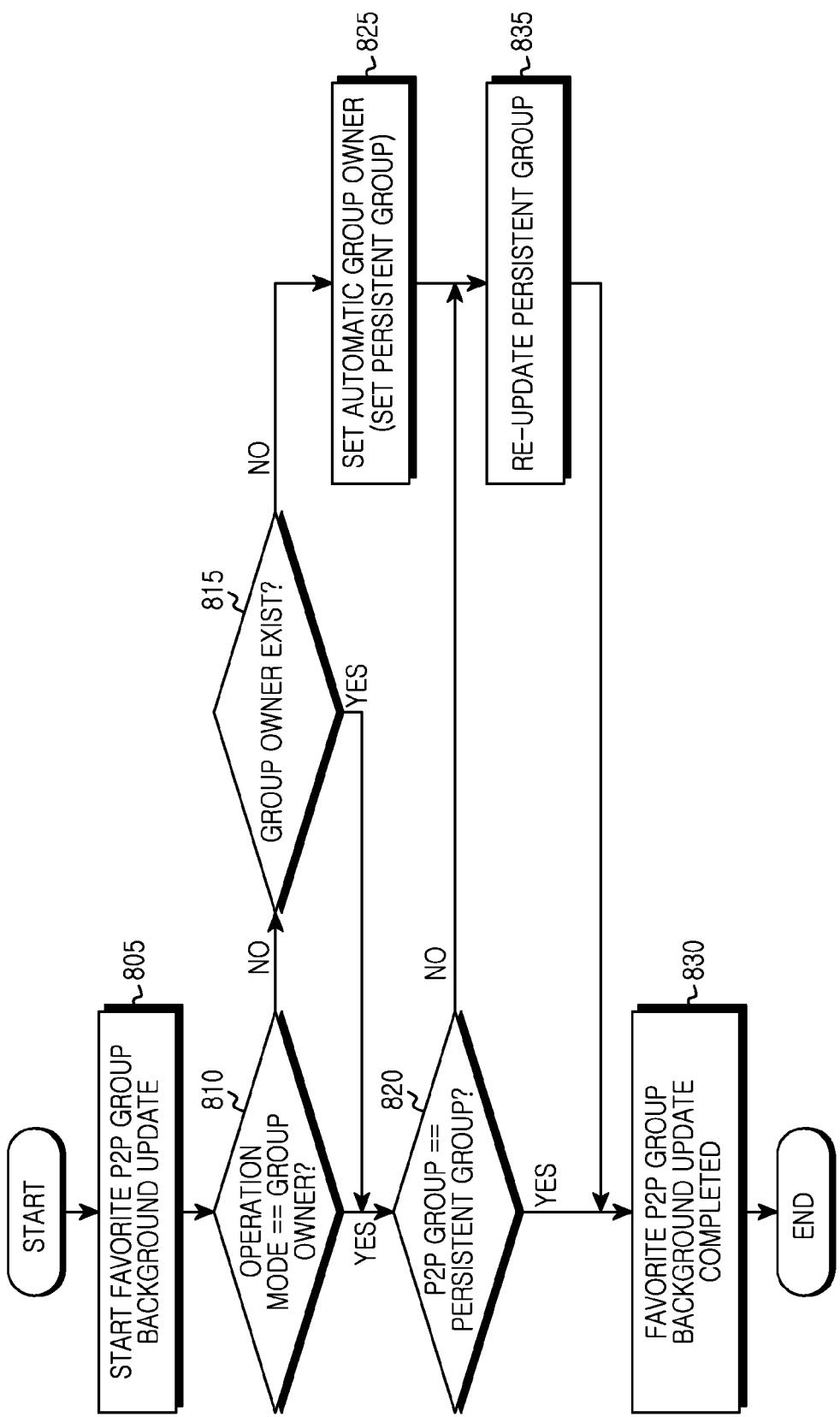
FIG. 8 is a second flowchart illustrating the operation process of the electronic device according to the exemplary embodiment of the present invention.

FIG. 8 is a second flowchart illustrating an operation process of the electronic device according to the exemplary embodiment of the present invention.

Referring to FIG. 8, a background update process is illustrated, which is performed while the method of FIG. 7 is performed. When the background update process of a favorite P2P group starts in step 805, an operation mode of the electronic device 600 in the currently used P2P group is determined in step 810. However, if no operation mode is found in step 810, the method proceeds to step 815. As described above, since a Wi-Fi P2P group is configured around a group owner, existence of a P2P group owner is indispensably required.

Referring to step 810, in the case where the operation mode of the electronic device is a group owner mode as determined in step 810, whether the currently generated group is a persistent group is determined in step 820. However, if no persistent group is found, the method proceeds to step 835.

Referring to step 820, when the currently generated group is the persistent group, the background update process of the favorite P2P group is completed in step 830 and the method of FIG. 8 ends. In this case, profile information regarding a device retrieved from the P2P group, that is, a device list and an operation mode of a relevant device, an operation mode of the electronic device 600, a credential of a P2P group, an access point credential, a P2P group name, and a profile number for the name may be stored. The generated persistent group is one of P2P groups and the generated persistent group is not temporary.

As described above, when the currently generated group is designated as the persistent group, the relevant electronic device may omit a Provision Discovery Exchange, a Group Owner Negotiation Exchange, and a Provisioning process afterward by storing a credential and an operation mode of a current P2P group, so that a connection process may be reduced. The present invention is intended for maximizing usability of the present invention by allowing regeneration of a favorite P2P group to be based on a persistent group attribute of the Wi-Fi direct communication standard.

Referring to step 820, in the case where the P2P group is not the persistent group determined in step 820, a process for changing an attribute of a group to an attribute of the persistent group is performed in step 835, and the method proceeds to step 830. For this process, a Group Owner Negotiation Exchange and Provisioning processes are performed to establish a relation of the persistent group with all devices of a selected device list one by one.

The present invention makes possible a quick changing of an attribute of a group to an attribute of the persistent group without reconnection by making a maximum use of an attribute of the current group, and a connection process including Group Owner Negotiation Exchange may be performed again, but such a repeat of the connection process including Group Owner Negotiation Exchange may take much time when there are many devices. The above processes may be performed using various application methods. When a favorite P2P group, which is currently already selected, has an attribute of the persistent group, all selected devices store a credential of the current group, group owner device information, etc. to update the persistent group again. After that, the P2P group background update process is completed in step 830.

Referring to step 810, in the case where an operation mode of the electronic device is not the group owner mode in step 810 but a group owner already exists in step 815, a process for determining whether a generated group is the persistent group in step 820 and subsequent processes are performed.

However, in step 815, when the group owner does not exist, an automatic group owner generation process is performed in step 825, and the method proceeds to step 835. In this case, a process for setting the electronic device 600 to an automatic group owner, and designating the group as the persistent group to change an attribute of the group to an attribute of the persistent group is performed in step 825. The process for setting the electronic device 600 to the automatic group owner may be performed in step 825 or step 835.

After step 825, the persistent group is regenerated using the selected devices via an invitation process, and the persistent group updated step 835. At this point, the above-described credential storing process may be performed.

The method described above in relation with FIG. 8 under of the present invention may be provided as one or more instructions in one or more software modules, or computer programs stored in an electronic device.

Figure 9A:
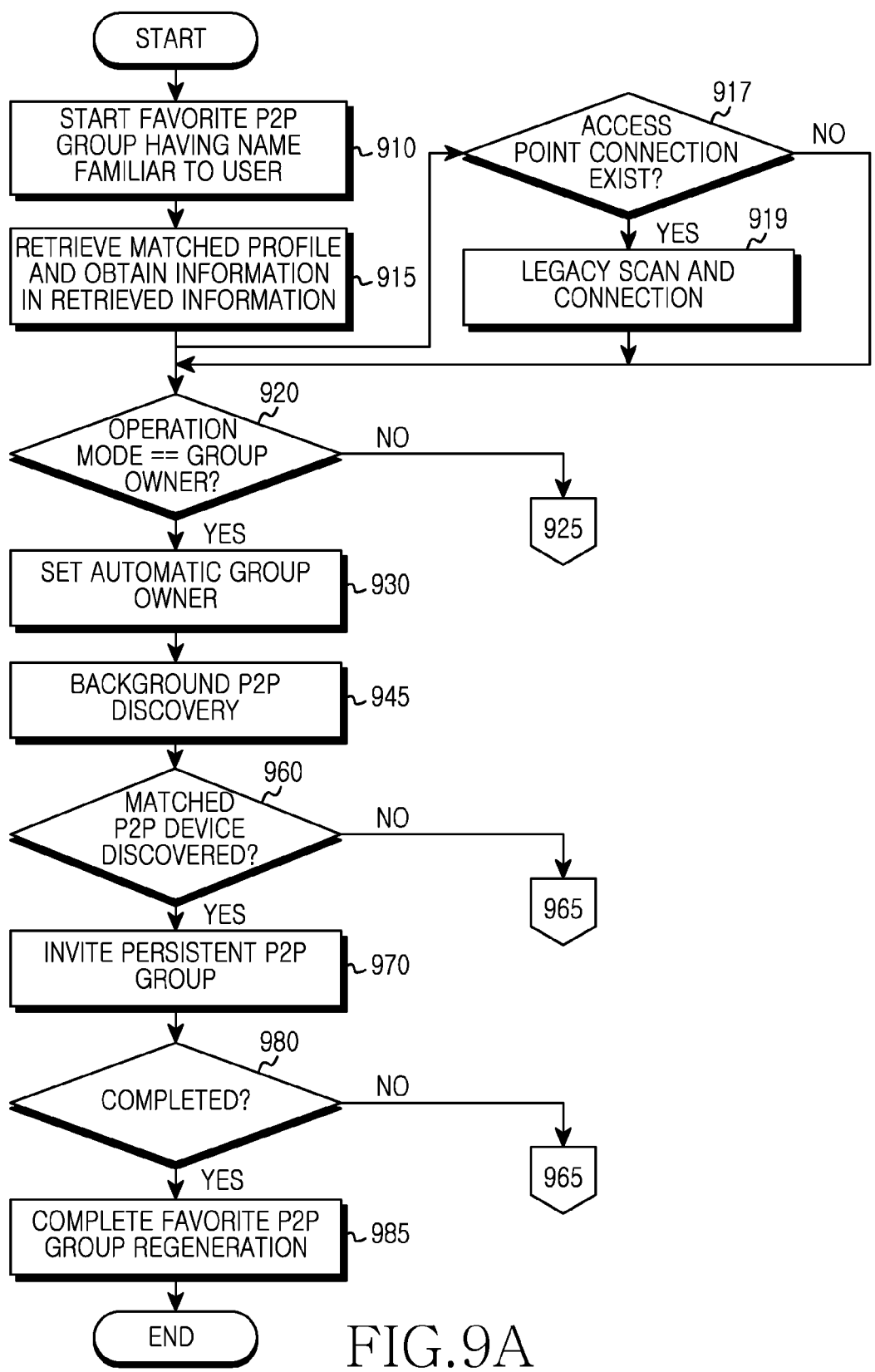

FIGS. 9A and 9B are a third flowchart illustrating the operation process of the electronic device according to the exemplary embodiment of the present invention.

Referring to FIGS. 9A and 9B, a process for regenerating a favorite P2P group profile is illustrated.

A user may select a specific familiar name set as a favorite P2P group from a favorite P2P group list, or when a linked application exists, may start the favorite P2P group by executing the relevant application in step 910.

After that, the electronic device 600 finds a profile number matching with a familiar name on a stored profile list for a favorite P2P group, and obtains stored profile information corresponding to the found profile in step 915. The method then proceeds to step 917.

In the case where access point information exists on the stored device list as determined in step 917, the relevant access point is scanned and connected via a credential of a stored access point in step 919, and the method proceeds to step 920. However, in step 917, if an access point does not exist, the method proceeds directly to step 920. When SCAN and connection processes are not performed, a user may be informed of such non-performance, for example, by an outputted message.

When the electronic device 600 is a group owner as determined in step 920, the stored P2P group sets the electronic device 600 to an automatic group owner in step 930. Otherwise, if the electronic device 600 is not a group owner, the method proceeds to step 925 in FIG. 9B.

After step 930, stored device lists are retrieved via a background P2P discovery process in step 945. When a matched P2P device is discovered in step 960, an invite message is transmitted to the discovered device to generate a persistent group in step 970. However, in step 960, if no matched P2P device is discovered, the method proceeds to step 965 in FIG. 9B. After step 970, the background P2P discovery process is checked whether the process is completed in step 980. If the process is not completed, the method proceeds to step 965 in FIG. 9B; otherwise, the method proceeds to step 985, in which the favorite P2P group regeneration is completed and the method ends.

Referring back to step 960, when retrieval and connection of a stored device list are not performed while the favorite P2P group is regenerated in step 960, a retrieval and connection process of a stored device list is continuously performed via the background P2P discovery process in step 945 until time-out arrives in step 965 of FIG. 9B.

When the time-out state arrives in step 965, a user is informed of such information and a state regarding a device currently not being connected in step 975, for example, by an outputted message, and the method ends.

Referring back to step 920, when the electronic device is not the group owner determine in step 920, the background P2P discovery process is performed first in step 925 and the matched P2P group owner device is checked so that the group owner is retrieved in step 935. If no matched P2P group owner device in step 935 when the time-out arrives in step 940, the method proceeds to step 955. However, if no time-out arrives in step 940, the method loops back to step 925.

In step 935, when the group is retrieved, generation of a persistent group is triggered using stored P2P group credential information in order to invite other devices in step 950. After that, a favorite P2P group background update process in step 945 and subsequent steps are performed for the rest of the devices in the group.

Referring to step 940, when time-out arrives without retrieval in step 940, the favorite P2P group background update process ends in step 955, and the user is informed of information and a state for a currently not connected device in step 975, for example, by an outputted message, and the method ends.

The present invention provides an advantage of allowing a user to simply recover a favorite P2P device group by simply selecting a device of the favorite P2P group or starting a connected application without reconnecting the device of the favorite P2P group that uses the same application one by one every time.

The method described above in relation with FIGS. 9A and 9B under of the present invention may be provided as one or more instructions in one or more software modules, or computer programs stored in an electronic device.

According to the present invention, a generation speed of a P2P group may be raised, use convenience of a user of a Wi-Fi direct device may be maximized, and an advantage of a Wi-Fi direct communication system that can configure a 1:N mode group compared to the P2P technology of the prior art may be more efficiently used.

The above-described apparatus and methods according to the present invention can be implemented in hardware, firmware or as software or computer code that can be stored in a non-transitory recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for regenerating a group of an electronic device in a Wi-Fi direct communication system, the method comprising:
   obtaining, by the electronic device, profile information of the group, wherein the profile information corresponds to an identified profile on a stored profile list;
   determining an operation mode of the electronic device from the obtained profile information;
   when the operation mode is a group owner mode, setting the electronic device to be an automatic group owner;
   retrieving, from a stored device list, at least one other device included in the profile information, wherein the profile information includes one or more other device which has been connected to the electronic device;
   transmitting, from the electronic device, an invitation request message to the retrieved at least one other device;
   receiving, by the electronic device, an invitation response message from the retrieved at least one other device; and
   when the invitation response message is accepted, completing the group regeneration by connecting to the retrieved at least one other device.

2. The method of claim 1, further comprising, before the determining of the operation mode in the information of the obtained profile:
   receiving a name of the group to regenerate; and
   retrieving a profile number that matches with the name of the group to regenerate.

3. The method of claim 1, wherein the profile information comprises at least one of a retrieved device list, an operation mode of a relevant other device, an operation mode of the electronic device, a credential of a peer-to-peer (P2P) group, an access point credential, a P2P group name, and a profile number of the P2P group name.

4. The method of claim 1, further comprising:
   receiving a group name and an application to be connected to the electronic device; and
   updating profile information of the group stored in the electronic device.

5. The method of claim 4, wherein the profile information comprises at least one of a retrieved device list, an operation mode of a relevant device, an operation mode of the electronic device, a credential of a peer-to-peer (P2P) group, an access point credential, a P2P group name, and a profile number of the P2P group name.

6. The method of claim 4, wherein the updating of the profile information of the group comprises:
   storing the updated profile information of the group in the electronic device; and
   when the electronic device is a group owner and the group is a persistent group, completing a group generation.

7. The method of claim 6, further comprising, when the electronic device is not the group owner but the group owner exists, and the group is the persistent group, completing the group generation.

8. The method of claim 6, further comprising:
   when the electronic device is not the group owner and the group owner does not exist, setting the electronic device to be an automatic group owner; and
   when the group is the persistent group, completing the group generation.

9. The method of claim 8, further comprising:
   when the group is not the persistent group, setting the group to the persistent group; and
   completing the group generation to include the electronic device.

10. An electronic device for regenerating a group, the electronic device comprising:
    one or more processors;
    a memory; and
    one or more programs stored in the memory and configured for execution by the one or more processors,
    wherein the one or more programs obtains profile information of the group by the electronic device, wherein the profile information corresponds to an identified profile on a stored profile list, determines an operation mode of the electronic device from the obtained profile information, when the operation mode is a group owner mode, sets the electronic device to be an automatic group owner, retrieves at least one other device included in the profile information from a stored device list, wherein the profile information includes one or more other device which has been connected to the electronic device, transmits an invitation request message to the retrieved at least one other device from the electronic device, receives an invitation response message from the retrieved at least one other device by the electronic device and, when the invitation response message is accepted, completes the group regeneration by connecting to the retrieved at least one other device.

11. The device of claim 10, wherein before determining the operation mode in the information of the obtained profile, the one or more programs receive a name of a group to regenerate and retrieves a profile number that matches with the name of the group to regenerate.

12. The device of claim 10, wherein the profile information comprises at least one of a retrieved device list, an operation mode of a relevant device, an operation mode of the electronic device, a credential of a peer-to-peer (P2P) group, an access point credential, a P2P group name, and a profile number of the name.

13. The device of claim 10, wherein the one or more programs further receives a group name and an application to be connected and updates profile information of the group.

14. The device of claim 13, wherein the profile information comprises at least one of a retrieved device list, an operation mode of a relevant device, an operation mode of the electronic device, a credential of a peer-to-peer (P2P) group, an access point credential, a P2P group name, and a profile number of the name.

15. The device of claim 13, wherein when updating the profile information of the group, the one or more programs store the profile information of the group, and
    when the electronic device is a group owner and the group is a persistent group, the one or more programs complete group generation.

16. The device of claim 15, wherein when the electronic device is not the group owner but the group owner exists, and the group is the persistent group, the one or more programs complete the group generation.

17. The device of claim 15, wherein when the electronic device is not the group owner and the group owner does not exist, the one or more programs set the electronic device to an automatic group owner, and
    when the group is the persistent group, the one or more programs complete the group generation.

18. The device of claim 17, wherein when the group is not the persistent group, the one or more program set the group to the persistent group, and completes the group generation.

* * * * *

UNITED STATES PATENT AND TRADEMARK OFFICE
CERTIFICATE OF CORRECTION

| | |
|---|---|
| PATENT NO. | : 9,100,801 B2 |
| APPLICATION NO. | : 13/778874 |
| DATED | : August 4, 2015 |
| INVENTOR(S) | : Bu-Seop Jung |

It is certified that error appears in the above-identified patent and that said Letters Patent is hereby corrected as shown below:

In the claims

Column 16, Claim 10, Line 24 should read as follows:
--…device and when the…--

Signed and Sealed this
Twenty-fourth Day of November, 2015

Michelle K. Lee
*Director of the United States Patent and Trademark Office*